United States Patent
Fukuda et al.

(10) Patent No.: US 7,464,591 B2
(45) Date of Patent: Dec. 16, 2008

(54) SEMICONDUCTOR ACCELERATION SENSOR

(75) Inventors: Yoshihisa Fukuda, Shijounawate (JP); Kouji Sakai, Takarazuka (JP); Atsushi Ishigami, Hirakata (JP); Eiichi Furukubo, Kadoma (JP); Ryosuke Meshii, Mishima-gun (JP); Takashi Yajima, Hisai (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 71 days.

(21) Appl. No.: 11/579,178

(22) PCT Filed: Jan. 20, 2006

(86) PCT No.: PCT/JP2006/000819

§ 371 (c)(1),
(2), (4) Date: Oct. 30, 2006

(87) PCT Pub. No.: WO2006/082716

PCT Pub. Date: Aug. 10, 2006

(65) Prior Publication Data

US 2008/0022770 A1 Jan. 31, 2008

(30) Foreign Application Priority Data

Feb. 1, 2005 (JP) ............................. 2005-024959

(51) Int. Cl.
*G01P 15/02* (2006.01)
*G01P 15/00* (2006.01)
(52) U.S. Cl. ................. 73/514.36; 73/514.38
(58) Field of Classification Search ............. 73/514.36, 73/514.38, 514.32, 514.33, 514.34, 514.29, 73/514.16
See application file for complete search history.

(56) References Cited

U.S. PATENT DOCUMENTS 5,284,057 A * 2/1994 Staller et al. ............. 73/514.36

(Continued)

FOREIGN PATENT DOCUMENTS

JP 7-159432 6/1995

(Continued)

OTHER PUBLICATIONS

English Language Abstract of JP 8-240609.

(Continued)

*Primary Examiner*—Helen C. Kwok
(74) *Attorney, Agent, or Firm*—Greenblum & Bernstein, P.L.C.

(57) ABSTRACT

A semiconductor acceleration sensor having beam parts formed in substantially L-shape to surround a weight part, wherein formed to surround a square part, as seen in plan view and constituting the weight part, are two elongated L-shaped beam parts, at locations close to proximal end portions of which are formed protruding portions protruding from a fixed part toward the weight part, and receiving recessed portions protruding from the weight part toward the fixed part to surround the protruding portions. The protruding portions have an outer shape substantially the same as an inner wall surface of the receiving recessed portions so that movements of the weight part in any directions in a horizontal direction perpendicular to an up and down direction are limited as a result of reception of the protruding portions by the receiving recessed portions. Thus, even when a side impact is applied to the acceleration sensor, the weight part is prevented from moving significantly, thereby preventing an excessive stress from being applied to the beam parts to break the beam parts.

18 Claims, 8 Drawing Sheets

U.S. PATENT DOCUMENTS

| | | | |
|---|---|---|---|
| 5,351,542 A | * | 10/1994 | Ichimura et al. .......... 73/514.33 |
| 5,490,421 A | * | 2/1996 | Ueyanagi .................. 73/514.33 |
| 6,392,220 B1 | * | 5/2002 | Slater et al. ................. 250/216 |
| 2006/0053908 A1 | | 3/2006 | Ishigami et al. |

FOREIGN PATENT DOCUMENTS

| JP | 8-240609 | 9/1996 |
|---|---|---|
| JP | 11-337570 | 12/1999 |
| JP | 2000-338124 | 12/2000 |
| JP | 2000-346866 | 12/2000 |
| JP | 2002-055117 | 2/2002 |

OTHER PUBLICATIONS

English Language Abstract of JP 2000-346866.
English Language Abstract of JP 11-337570.
English Language Abstract of JP 2002-055117.
English Language Abstract of JP 2000-338124.
English Language Abstract of JP 7-159432.
U.S. Appl. No. 10/599,396 to Meshii et al., filed Sep. 27, 2006.

* cited by examiner (a)

(b)

PRIOR ART

SEMICONDUCTOR ACCELERATION SENSOR

TECHNICAL FIELD

The present invention relates to a semiconductor acceleration sensor, and more particularly to a semiconductor acceleration sensor which has a weight part connected by elongated beam parts to a fixed part, and which, with an applied acceleration, detects the acceleration by using a movement of the weight part in the direction of the acceleration caused by bending of the beam parts.

BACKGROUND ART

A semiconductor acceleration sensor is conventionally known to detect an acceleration based on a movement of a weight part relative to a fixed part when the acceleration is applied thereto. This acceleration sensor has a weight part which is a movable part provided on an end of a cantilever-like bending portion (thin beam part) extending from the fixed part, and has such a structure that causes the bending portion to bend and the weight part to move when an acceleration is applied thereto, and that electrically detects the change. As described in Japanese Laid-open Patent Publication 2000-338124 and Japanese Laid-open Patent Publication Hei 7-159432, examples of the type for electrically detecting movement of the weight part include, for example: acceleration sensors that form a gauge resistor on a bending portion connecting the weight part, and measure a change in a resistance value of the gauge resistor so as to detect a bending of the bending portion; and those that form the weight part itself into an electrode, and detect a change in electrostatic capacity caused by movement of the weight part to change the distance from a fixed electrode part.

This kind of acceleration sensors are formed to allow the volume (weight) of the weight part to be large, and the bending portion to be as thin as possible, in order to achieve smooth movement of the weight part when an acceleration is applied. This has led to a risk that the bending portion may break, making it impossible to detect the acceleration, when the weight part suddenly moves, or moves beyond a normal movement range.

Thus, in order to prevent the above problem, an acceleration sensor has been developed which has a stopper formed in a space around the weight part to limit the movement of the weight part. For example, in the acceleration sensor described in the above Patent Publication 1, stoppers are formed at upper and lower positions in a space for the weight part to move so that the weight part is prevented from moving beyond a predetermined amount in an up and down direction which is the primary direction to detect the acceleration. Furthermore, a stopper is also formed beside the weight part so that the weight part hardly moves when a side impact is applied, thereby preventing the bending portion from breaking.

On the other hand, there is an acceleration sensor in which the length of beam parts (bending portions) connecting a fixed part to a weight part is elongated so as to increase the sensitivity of the acceleration sensor. As shown in FIG. 16, this sensor 50 has beam parts 51 formed in L-shape having proximal ends 51a at two opposite sides of a weight part 52 and extending along two adjacent sides of the weight part 52 so as to form a structure such that two beam parts 51 surround the perimeter of the weight part 52. In this sensor 50, the beam parts 51 bend and the weight part 52 moves upward or downward when an acceleration is applied in an up and down direction (direction to penetrate the sheet surface of FIG. 16). Now, this acceleration sensor 50 is advantageous in that the lengths of the beam parts 51 can be formed to be sufficiently long, thereby making it possible to considerably increase the sensitivity of detecting acceleration. However, it is not easy to form a stopper such as shown in the above Patent Publication 1 to limit a side movement of the weight part 52, and there has been a risk that the beam parts 51 may consequently break due to an excessive movement of the weight part 52 in a horizontal direction.

Furthermore, in an acceleration sensor having a structure with the two beam parts 51 surrounding the perimeter of the weight part 52 as described above, in contrast to a weight part connected by a cantilever-like bending portion as described in the Patent Publications 1 and 2, it is possible for the weight part 52 to move in any directions (front-back and left-right direction) in the horizontal direction. It has been difficult to effectively limit the movements in any directions by a simple stopper.

DISCLOSURE OF INVENTION

Thus, an object of the present invention is to provide a semiconductor acceleration sensor that limits a movement range of a weight part in a horizontal direction perpendicular to an up and down direction which is a primary direction to detect an acceleration of the weight part in a semiconductor acceleration sensor having the above-described structure, and that prevents an excessive stress from being applied to beam parts connecting a fixed part to a weight part even when a side impact in any direction is applied, preventing the beam parts from breaking.

To achieve the above object, the present invention provides a semiconductor acceleration sensor having a fixed part and a weight part connected to the fixed part by elongated beam parts with bending properties so as to electrically detect a movement of the weight part when an acceleration is applied thereto. Therein, the beam parts are formed in L-shape having proximal ends at two opposite sides of the weight part and extending along two sides of the weight part adjacent thereto so as to allow a vertical movement of the weight part when an acceleration in a vertical direction is applied to the sensor. There are provided a protruding portion protruding from the fixed part toward the weight part, and a receiving recessed portion protruding from the weight part toward the fixed part to surround the protruding portion, at a location close to the proximal end of each of the beam parts and in a space between the weight part and the fixed part. Further, the protruding portion contacts an inner wall surface of the receiving recessed portion so as to limit horizontal movement of the weight part, when an acceleration in a horizontal direction is applied to the sensor.

This makes it possible to limit a movement range of the weight part in the horizontal direction perpendicular to an up and down direction which is a primary direction to detect an acceleration of the weight part, and to prevent an excessive stress from being applied to the beam parts connecting the fixed part to the weight part even when a side impact in any direction is applied, preventing the beam parts from breaking.

The present invention further provides a semiconductor acceleration sensor having a fixed part and a weight part connected to the fixed part by elongated beam parts with bending properties so as to electrically detect a movement of the weight part when an acceleration is applied thereto. Therein, the beam parts are formed in L-shape having proximal ends at two opposite sides of the weight part and extending along two sides of the weight part adjacent thereto so as to allow a vertical movement of the weight part when an acceleration in a vertical direction is applied to the sensor. The weight part has a recessed portion formed in a bottom portion thereof. A stopper to loosely fit the recessed portion is formed on the fixed part immediately below the weight part. Further, the stopper contacts an inner wall surface of the recessed portion so as to limit horizontal movement of the weight part, when an acceleration in a horizontal direction is applied to the sensor.

This makes it possible to limit a movement range of the weight part in the horizontal direction perpendicular to an up and down direction which is a primary direction to detect an acceleration of the weight part, and also to limit its vertically downward movement, so that even when a side impact and an impact to move the weight part vertically downward are applied thereto, an excessive stress is prevented from being applied to the beam parts connecting the fixed part to the weight part, preventing the beam parts from breaking.

The present invention further provides a semiconductor acceleration sensor having a fixed part and a weight part connected to the fixed part by elongated beam parts with bending properties so as to electrically detect a movement of the weight part when an acceleration is applied thereto. Therein, the beam parts are formed in L-shape having proximal ends at two opposite sides of the weight part and extending along two sides of the weight part adjacent thereto so as to allow a vertical movement of the weight part when an acceleration in a vertical direction is applied to the sensor. A stopper to enclose a bottom portion of the weight is formed on the fixed part below the weight part. Further, the bottom portion of the weight part contacts an inner surface of the stopper so as to limit horizontal movement of the weight part, when an acceleration in a horizontal direction is applied to the sensor.

This makes it possible to limit a movement range of the weight part in the horizontal direction perpendicular to an up and down direction which is a primary direction to detect an acceleration of the weight part, and to prevent an excessive stress from being applied to the beam parts connecting the fixed part to the weight part even when a side impact in any direction is applied, preventing the beam parts from breaking.

BRIEF DESCRIPTION OF DRAWINGS

FIG. 1(a) is a top plan view of a semiconductor acceleration sensor according to a first embodiment of the present invention, while FIG. 1(b) is a top plan view of a silicon substrate portion of the sensor;

BEST MODE FOR CARRAYING OUT THE INVENTION

Figure 1:
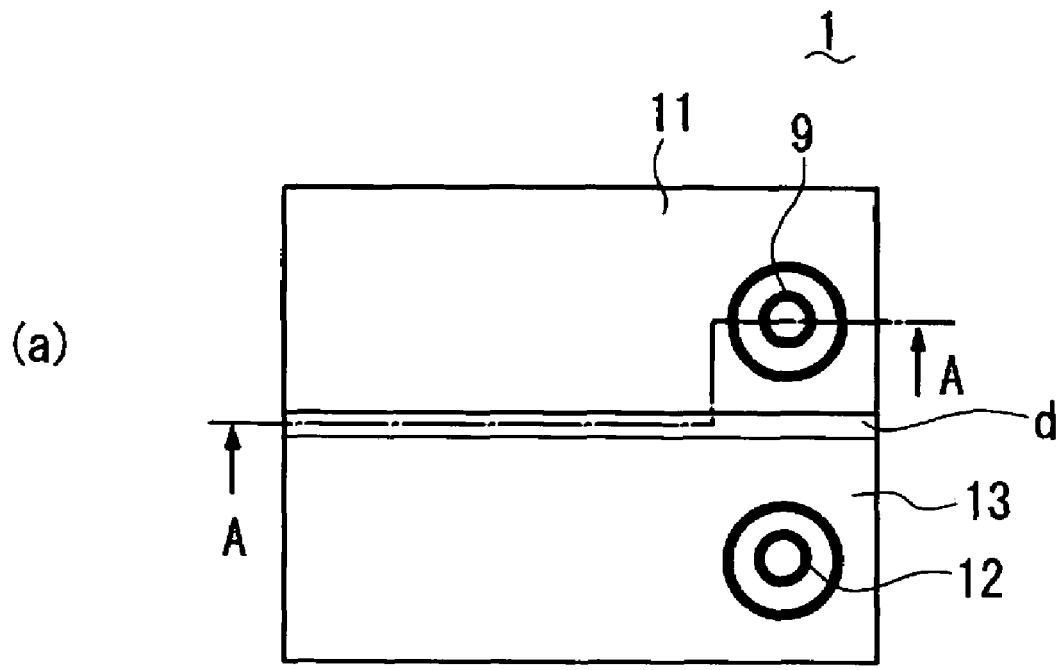
Figure 1:
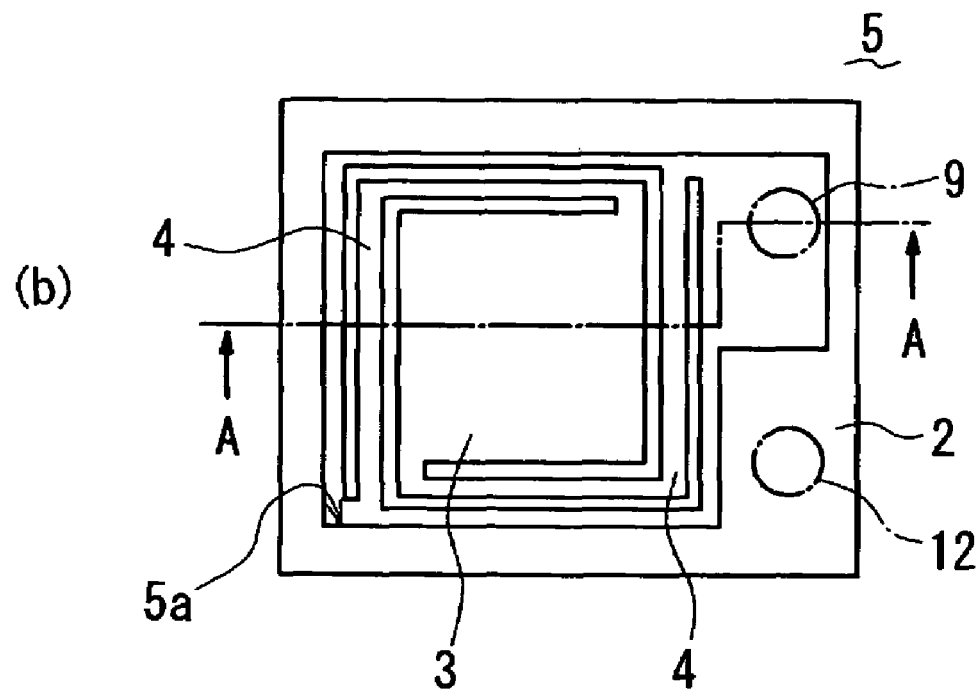
Figure 2:
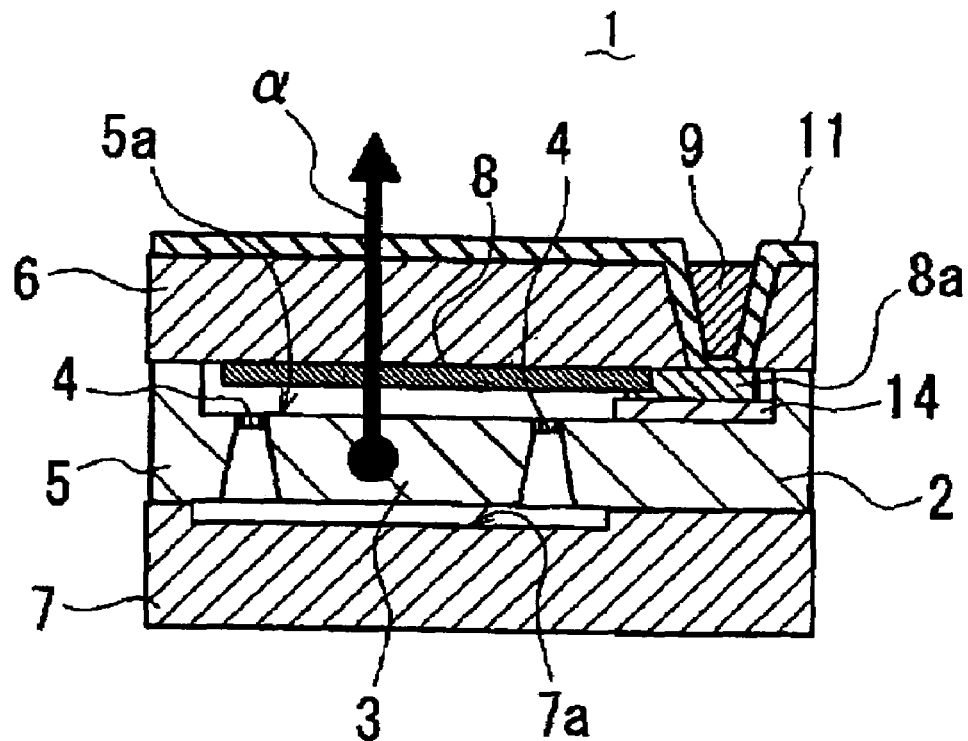
FIG. 2 is a cross-sectional view along A-A line in FIG. 1(b)

Hereinafter, a first embodiment of the present invention will be described with reference to the drawings. First, referring to FIG. 1 and FIG. 2, the entire structure of a semiconductor acceleration sensor according to the present embodiment will be described. The acceleration sensor 1 of the present embodiment comprises a silicon substrate 5 having a fixed part 2, a weight part 3 and beam parts 4 formed therein as well as glass parts 6, 7 sandwiching the silicon substrate 5 from the top and bottom, in which a space for the weight part 3 to move up and down is formed by a recessed portion 7a formed in the lower glass part 7 and a recessed portion 5a formed in an upper surface of the silicon substrate 5 (FIG. 2). A fixed electrode 8 using a conductive thin film is formed on a lower surface of the upper glass part 6. A voltage is applied to this fixed electrode 8 via a conductive lead metal film 11 which passes through a through-hole 9.

Figure 3:
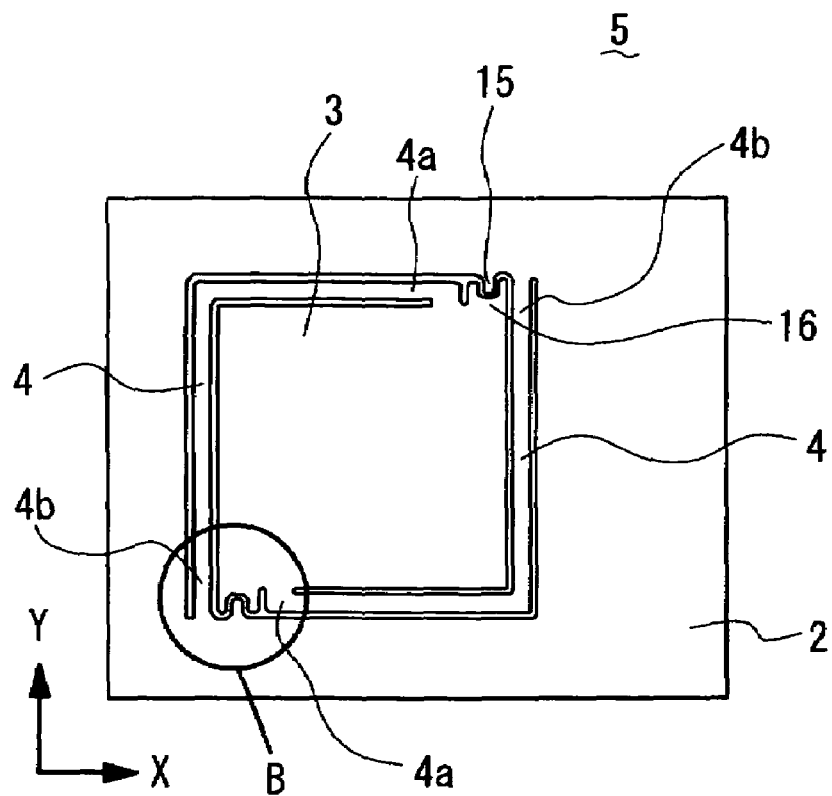
FIG. 3 is a top plan view of the silicon substrate in the semiconductor acceleration sensor according to the first embodiment.
Figure 4:
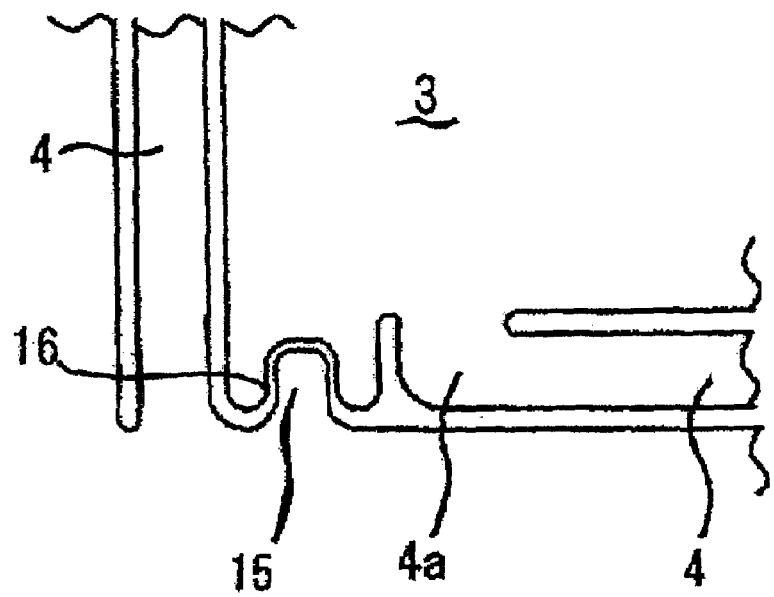
FIG. 4 is an enlarged view of part B of FIG. 3.

It is also designed so that a voltage is applied to the silicon substrate 5 itself via a conductive lead metal film 13 which passes through another through-hole 12 formed in the upper glass part 6, so as to detect an electrical change, more specifically a change in value of electrostatic capacity, when the weight part 3 moves upward with an acceleration α then applied thereto to change the distance between the weight part 3 and the fixed electrode 8. The metal films 11, 13 formed on an upper surface of the glass part 6 are formed to be separated from each other by a predetermined distance d to prevent a short circuit (FIG. 1(a)). An oxide film ($SiO_2$) 14 is formed between a proximal end portion 8a of the fixed electrode 8 and the silicon substrate 5 in order to increase insulation. Note that to show the entire structure of the semiconductor acceleration sensor 1, the details are omitted in FIG. 1 and FIG. 2, while an accurate structure of the silicon substrate 5 will be described next with reference to FIG. 3 and FIG. 4.

The silicon substrate 5 of the present embodiment has two elongated beam parts 4 formed in L-shape to surround a square part as seen in plan view and constituting the weight part 3. One ends 4a of these beam parts 4 are connected to two opposite sides of the weight part 3, while the other ends 4b thereof are connected to the fixed part 2. Furthermore, the silicon substrate 5 according to the present embodiment has formed at locations close to the one ends 4a of the beam parts 4 connected to the weight part 3: protruding portions 15 protruding from the fixed part 2 toward the weight part 3; and receiving recessed portions 16 protruding from the weight part 3 toward the fixed part 2 to surround the protruding portions 15. The protruding portions 15 have an outer shape substantially the same as an inner wall surface of the receiving recessed portions 16 so that movements of the weight part 3 in any directions in a horizontal direction (XY direction in FIG. 3) perpendicular to the up and down direction are limited as a result of reception of the protruding portions 15 by the receiving recessed portions 16. Thus, even when a side impact is applied to the acceleration sensor 1, the weight part 3 is prevented from moving significantly, thereby preventing an excessive stress from being applied to the beam parts 4 to break the beam parts 4.

Since the movements of the weight part 3 in the horizontal direction are limited as described above, there is no risk for the beam parts 4 to break and for the acceleration sensor 1 to become unable to measure even when a horizontal impact is applied thereto. However, if the impact force is excessive, or if the impact is repeatedly applied at a high frequency, there occurs a possibility that the protruding portions 15 per se may break. In this case, it is possible to improve the impact resistance properties of the protruding portions 15 or the receiving recessed portions 16 by forming a space with a structure as described below in base portions of the protruding portions 15 or the receiving recessed portions 16.

Figure 5:
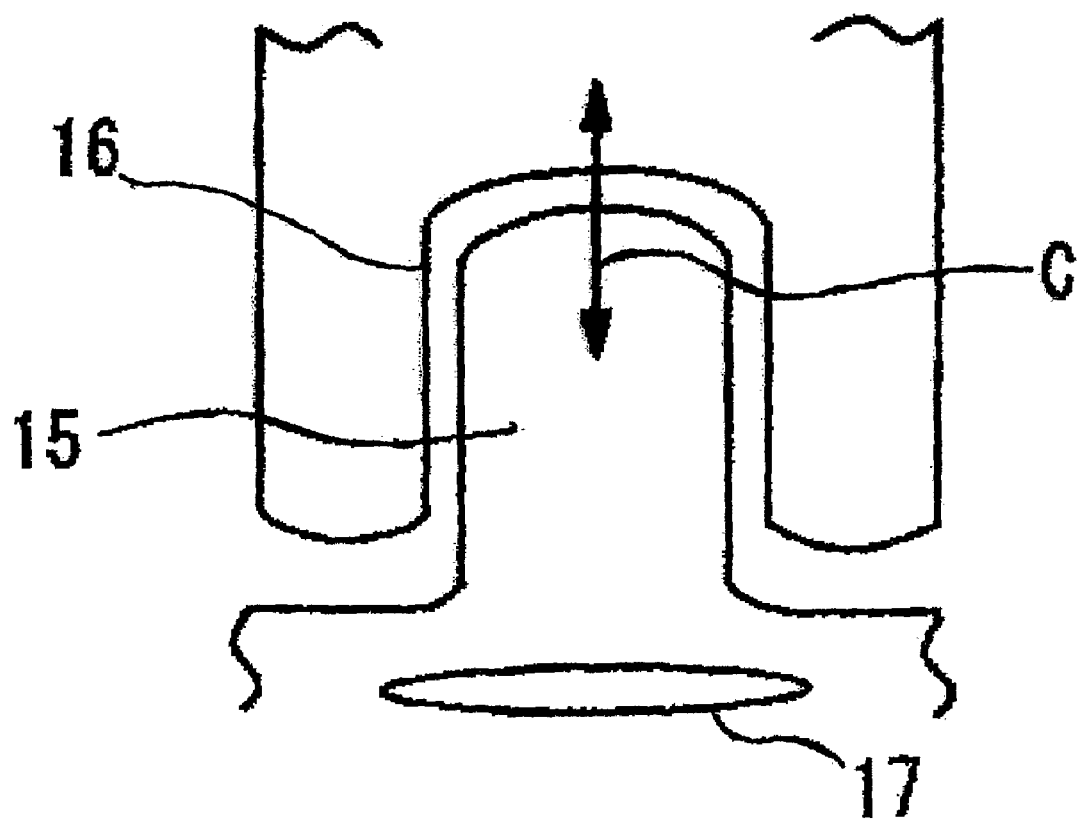
FIG. 5 is an enlarged view showing a protruding portion and a receiving recessed portion of the silicon substrate in the semiconductor acceleration sensor according to the first embodiment.

That is, as shown in FIG. 5, a gap 17 extending in a direction perpendicular to the protruding direction of a protruding portion 15 and having a length of about the width of the protruding portion 15 is formed in a base portion of the protruding portion 15. This structure makes it possible that when a downward impact in FIG. 5 is applied to the weight part 3 to cause a receiving recessed portion 16 to collide with the protruding portion 15, the impact then is reduced by bending of the protruding portion 15 in its length direction (arrow C), thereby reducing the risk for the protruding portion 15 itself to break.

Figure 6:
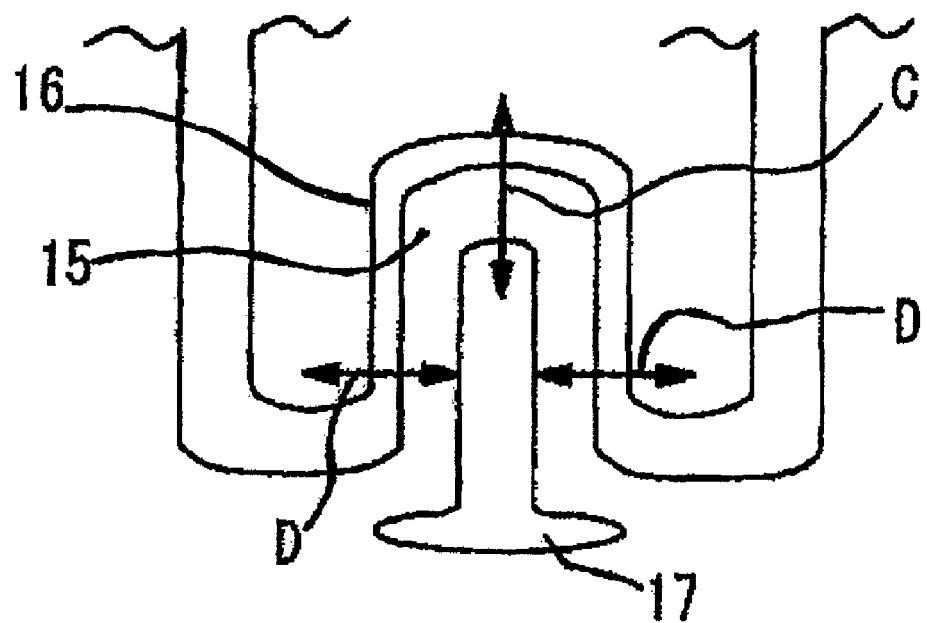
FIG. 6 is an enlarged view showing another example of the protruding portion and receiving recessed portion.

Further, as shown in FIG. 6, if a gap 17 formed in a base portion of a protruding portion 15 is formed to have a substantially T-shape which also extends into the protruding portion along the protruding direction of the protruding portion 15, the protruding portion 15 is provided with bending properties not only in the length direction (arrow C), but also in the width direction (arrow D), thereby further improving the impact resistance properties of the protruding portion 15.

Figure 7:
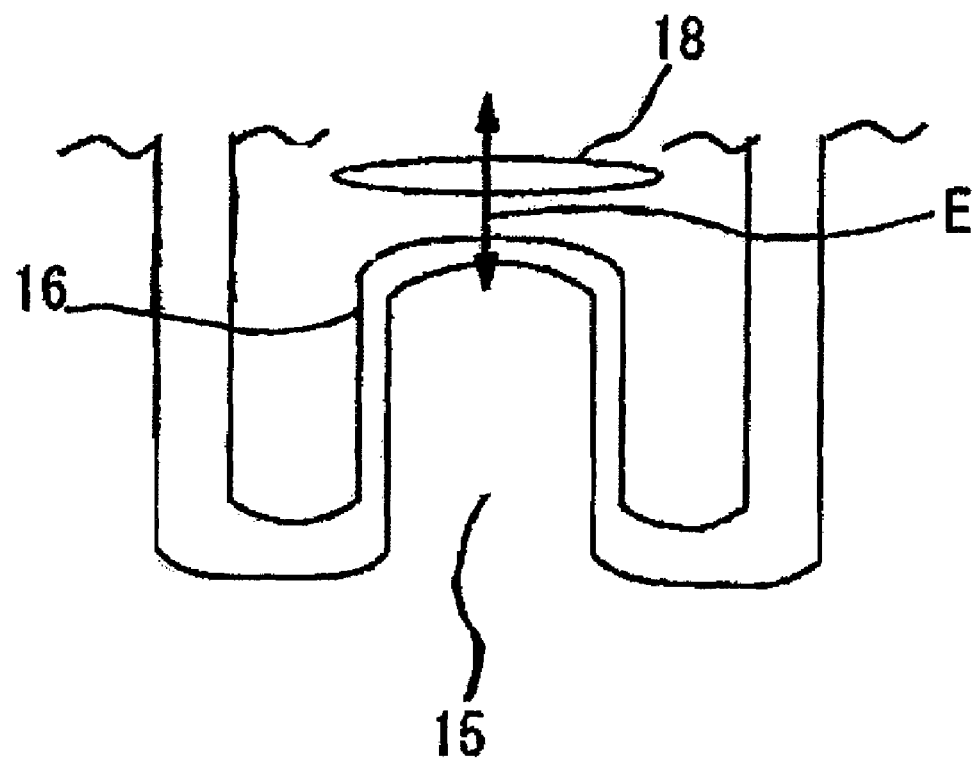
FIG. 7 is an enlarged view showing still another example of the protruding portion and receiving recessed portion.

Furthermore, as shown in FIG. 7, if a gap 18 extending in the width direction of the protruding portion 15 is formed in a base portion of a receiving recessed portion 16, it can reduce an impact in the direction of arrow E which is received by the receiving recessed portion 16 when the receiving recessed portion 16 collides with the protruding portion 15, thereby reducing the risk for the protruding portion 15 and receiving recessed portion 16 to break. As compared with the structure which forms a gap 17 in a base portion of a protruding portion 15, this structure, which forms the gap 18 in the base portion of the receiving recessed portion 16, makes it possible to obtain comparable impact resistance properties without increasing the size of the protruding portion 15 itself, so that the size of the receiving recessed portion 16 can be made smaller for that. This makes it unnecessary to reduce the volume (weight) of the weight part 3, which receives an acceleration, so that the decrease of sensitivity of the acceleration sensor can be suppressed for that. Note that the formation of the gap 17 or gap 18 can improve the impact resistance properties of the protruding portion 15 or the receiving recessed portion 16, and reduce an impact transmitted to the weight part 3, so that it has an effect of preventing the weight 3 itself from breaking and further the beam parts 4 from breaking.

Figure 8:
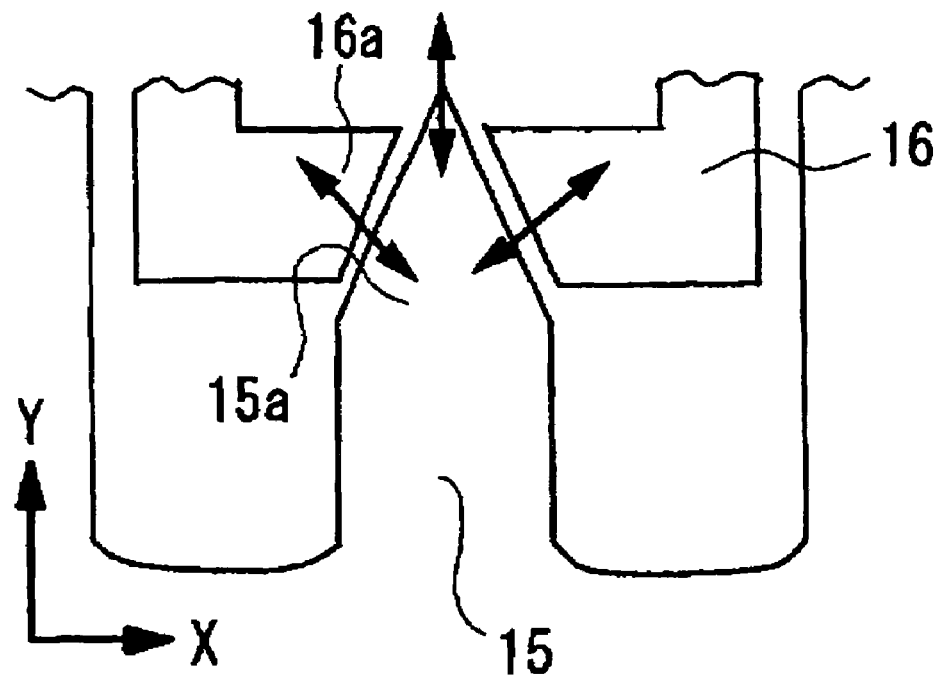
FIG. 8 is an enlarged view showing a protruding portion and a receiving recessed portion of a silicon substrate in a semiconductor acceleration sensor according to a second embodiment of the present invention.

Next, referring to FIG. 8, a second embodiment will be described. The entire structure of a semiconductor acceleration sensor 1 of the present embodiment is the same as the first embodiment, while the shape of a protruding portion 15 and a receiving recessed portion 16 is formed in a taper shape as described below. More specifically, the protruding portion 15 has an end formed in a taper shape 15a which gradually decreases in diameter, while the recessed portion 16 has a tapered receiving portion 16a having the same shape as the taper shape 15a of the end of the protruding portion. Thus, the receiving recessed portion 16 and the protruding portion 15 contact each other while sliding along both tapered surfaces, when a side impact is applied so that the weight part 3 moves horizontally, and the receiving recessed portion 16 collides to the protruding portion 15, thereby reducing the impact. More specifically, if the direction in which the receiving recessed portion 16 moves to contact the protruding portion 15 is other than the direction perpendicular to the tapered surface, the impact force which the receiving recessed portion 16 exerts on the protruding portion 15 is divided into a force component along the tapered surface and a force component along a plane perpendicular to the tapered surface, so that the impact force applied to the protruding portion 15 is reduced. Thus, it is possible to reduce a risk for the protruding portion 15 itself to break. In addition, the reduction of the impact gives an effect to prevent the weight part 3 from breaking and further the beam parts 4 from breaking.

Figure 9:
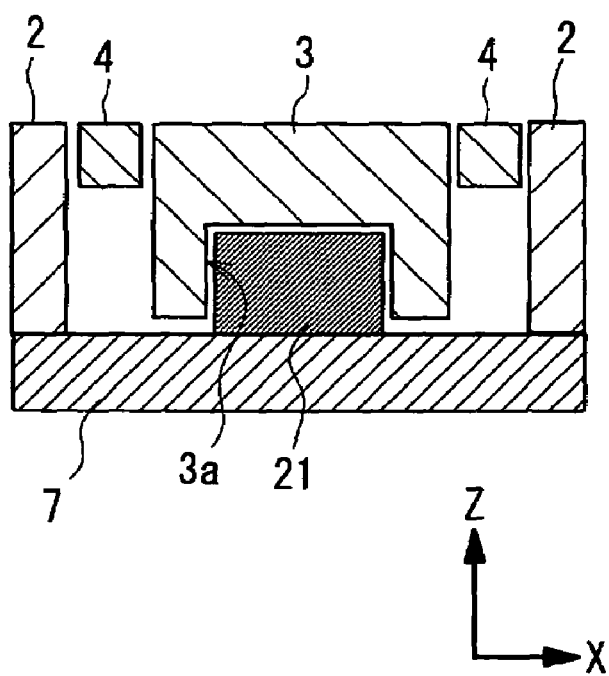
FIG. 9 is a longitudinal cross-sectional view of a lower glass part and a silicon substrate portion in a semiconductor acceleration sensor according to a third embodiment of the present invention.

Next, referring to FIG. 9 and FIG. 10, a third embodiment will be described. The entire structure of a semiconductor acceleration sensor 1 of the present embodiment is also substantially the same as the first embodiment, while a square recessed portion 3a, in place of the protruding portion 15 and the receiving recessed portion 16, is formed in a bottom portion of a weight part 3, and a stopper 21 to loosely fit the recessed portion 3a is formed on a lower glass part 7 (FIG. 9) in order to limit the horizontal movement of the weight part 3. By the loose fitting of the recessed portion 3a of the weight part 3 to the stopper 21, the horizontal movement of the weight part 3 is limited, and a vertically downward movement of the weight part 3 is limited. Thus, when the acceleration sensor 1 receives a side impact, the weight part 3 is prevented from significantly moving in the horizontal direction, preventing beam parts 4 from breaking. Since an excessive vertically downward movement of the weight part 3 is limited, the bending amount of the beam parts 4 is prevented from becoming excessive. For this reason as well, the beam parts 4 can be prevented from breaking.

Figure 10:
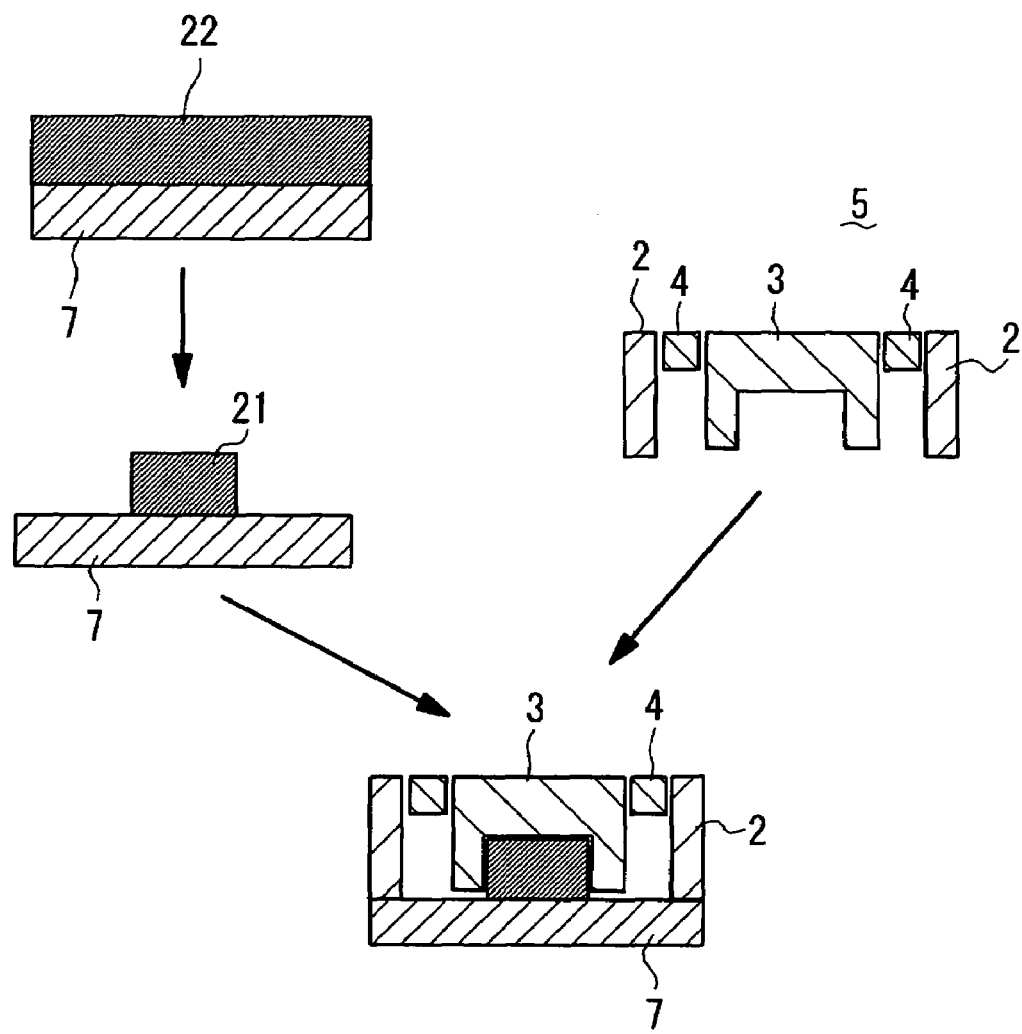
FIG. 10 is a chart showing a process of manufacturing the lower glass part and silicon substrate part.

Note that the stopper 21 is formed by subjecting a stopper material 22 formed e.g. of silicon on the glass part 7 as a base to anisotropic etching such as ICP (Inductively Coupled Plasma) etching or RIE (Reactive Ion Etching), and by anodically bonding thereto a silicon substrate 5 prepared by a separate process (FIG. 10). It is an easier process to thus form a separate material on the glass part 7, and process this into the stopper 21. Furthermore, if a material softer than the silicon material of the silicon substrate 5 is used for the stopper 21, it is possible for the stopper 21 itself to absorb an impact when the weight part 34 collides with the stopper 21, while the reduction of the impact transmitted to the weight part 3 and the beam parts 4 makes it possible to prevent the weight part 3 and the beam parts 4 from breaking.

Besides, not only the dry etching such as ICP etching or RIE, but anisotropic wet etching can also be used as a method of processing the stopper material 22 formed on the glass part 7. The anisotropic wet etching improves the mass productivity because it is not a sheet-by-sheet process.

Further, in the present embodiment, the recessed portion 3a at the bottom portion of the weight part 3 is square, and the stopper 21 is square to fit the recessed portion 3a. Accordingly, among side impacts applied to the acceleration sensor 1, the impact resistance properties to impacts in a direction perpendicular to the peripheral surface of the stopper 21 are different from the impact resistance properties to impacts in a direction other than the direction perpendicular to the peripheral surface of the stopper 21 (e.g. impact to a corner portion of the stopper 21). However, the use of the following structure makes it possible to obtain impact resistance properties to be equivalent for impacts in any directions in the horizontal direction.

Figure 11:
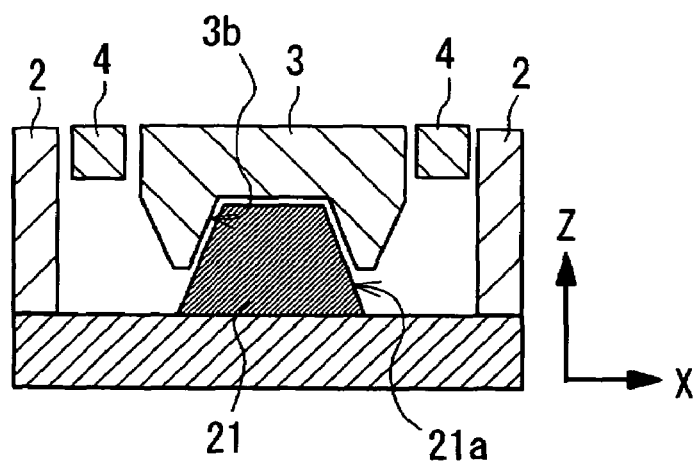
FIG. 11 is a longitudinal cross-sectional view of the lower glass part and silicon substrate part.
Figure 12:
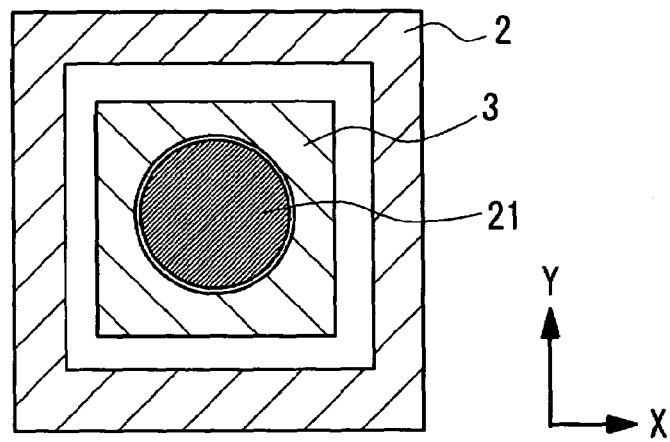
FIG. 12 is a lateral cross-sectional view of the lower glass part and silicon substrate part.

That is, as shown in FIG. 11 and FIG. 12, a stopper 21 formed on a glass part 7 is formed to have a truncated cone shape 21a, while the weight part 3 is formed to have an inner surface 3b in a recess at a bottom thereof which is a similar figure to the cone shape 21a of the stopper 21 to loosely fit the stopper 21. This structure, if used, makes it possible to obtain equivalent impact resistance properties for impacts in any directions in the horizontal direction (XY direction in FIG. 12), because the peripheral surface of the stopper 21 is circular. Thus, this makes it possible to prevent the stopper 21 itself from breaking.

Figure 13:
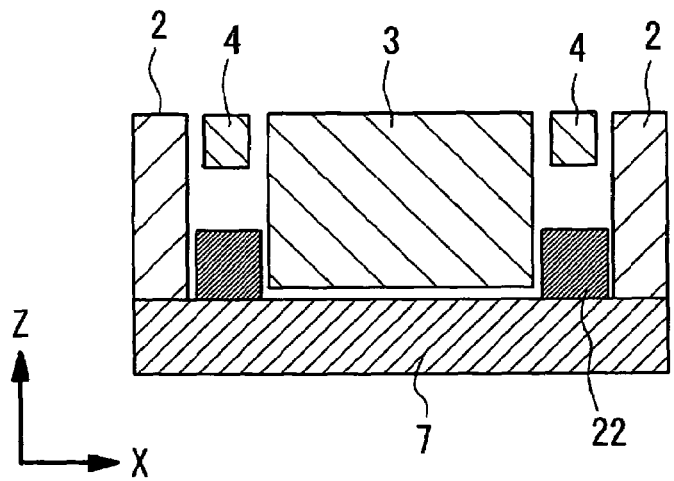
FIG. 13 is a longitudinal cross-sectional view of a lower glass part and a silicon substrate portion in a semiconductor acceleration sensor according to a fourth embodiment of the present invention.
Figure 14:
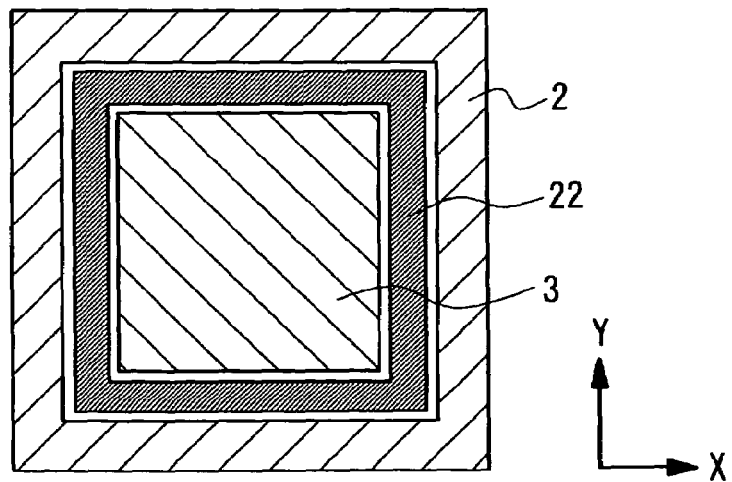
FIG. 14 is a lateral cross-sectional view of the lower glass part and silicon substrate part.

Next, referring to FIG. 13 and FIG. 14, a fourth embodiment will be described. The entire structure of a semiconductor acceleration sensor 1 of the present embodiment is also substantially the same as the first embodiment, while a rectangular frame-shaped stopper 22 to enclose a bottom portion of the weight 3 is formed on a lower glass part 7 in place of the protruding portion 15 and the recessed portion 16 in order to limit the horizontal movement of the weight part 3. As a result of the enclosure of the bottom portion of the weight part 3 by the rectangular frame-shaped stopper 22, the horizontal movements of the weight part 3 are limited. Thus, when the acceleration sensor 1 receives a side impact, the weight part 3 is prevented from significantly moving in the horizontal direction, preventing beam parts 4 from breaking. In the present embodiment, furthermore, it is not necessary to form such a recessed portion 3a in the weight part 3 as in the third embodiment, so that it has an advantage in that the volume (weight) of the weight part 3 is not reduced, and the sensitivity of the acceleration sensor can be held high for that.

Figure 15:
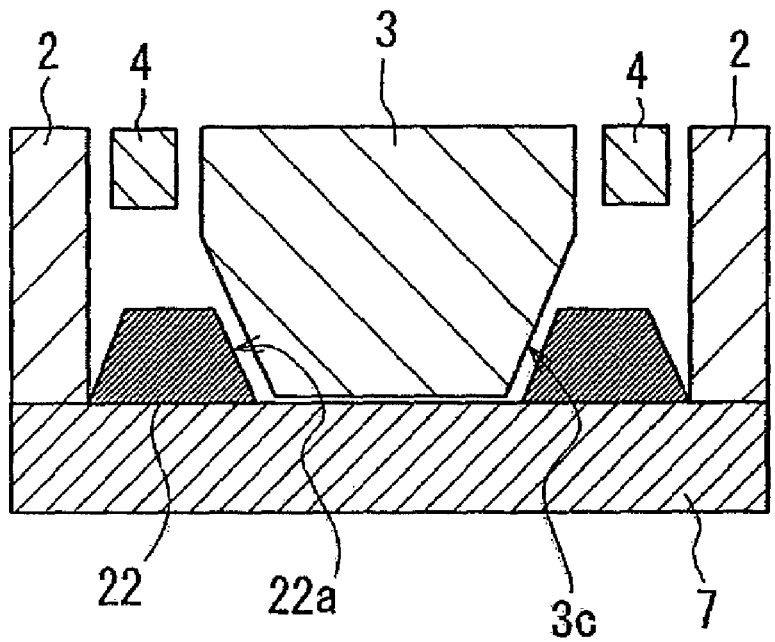
FIG. 15 is a longitudinal cross-sectional view of the lower glass part and silicon substrate part.
Figure 16:
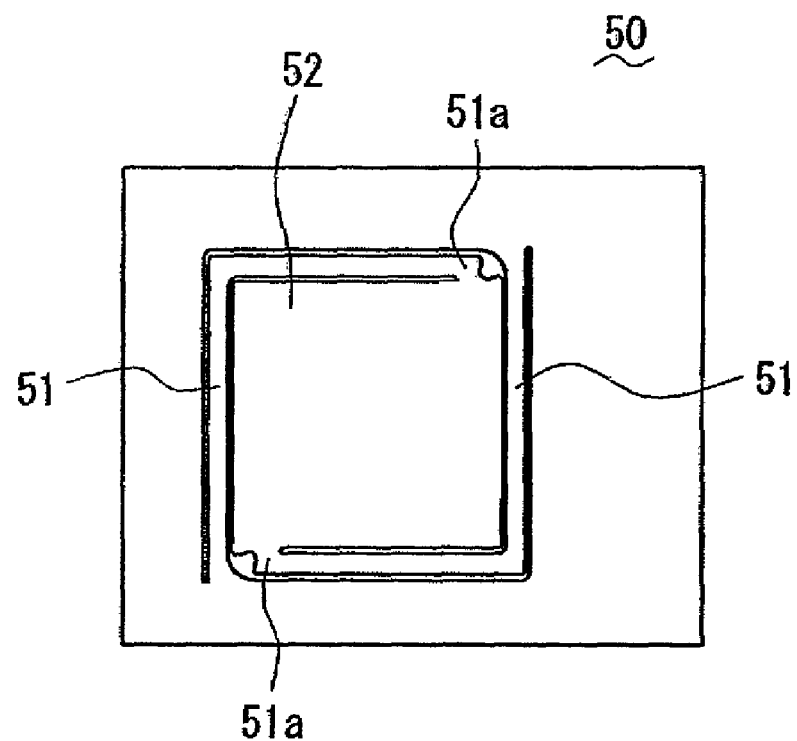
FIG. 16 is a top plan view of a silicon substrate in a conventional semiconductor acceleration sensor.

As shown in FIG. 15, in the present embodiment, furthermore, the weight part 3 can have a bottom portion formed in a truncated quadrangular pyramid shape 3c, while a stopper 22 can have an inner surface formed in a sloped surface 22a which extends along a peripheral surface of the weight part. In this case, when the weight part 3 horizontally moves to cause the bottom portion of the weight part 3 to collide with the inner surface of the stopper 22, the collision impact is divided into a force component along the sloped surface 22a and a force component in a direction perpendicular to the sloped surface 22a, so that the impact force received by each of the weight part 3 and the stopper 22 is reduced, making it possible to prevent the weight part 3 and the stopper 22 from breaking.

Further, similarly as in the stopper 21 in the third embodiment, if the stopper 22 formed on the lower glass part 7 in the present embodiment is formed also of a material which is different from the glass part 7 and softer than the silicon material of the silicon substrate 5, it is possible for the stopper 22 itself to absorb an impact when the bottom portion of the weight part 3 collides with the rectangular frame-shaped stopper 22 enclosing it, making it possible to prevent the weight part 3 and the beam parts 4 from breaking. In addition, similarly as in the third embodiment, not only the dry etching such as ICP etching or RIE, but anisotropic wet etching can also be used as a method of processing the stopper material formed on the glass part 7. The anisotropic wet etching improves the mass productivity because it is not a sheet-by-sheet process.

As described in the foregoing, in a semiconductor acceleration sensor 1 with beam parts 4 connecting a fixed part 2 to a weight part 3 being formed in substantially L-shape to surround the weight part 3, a protruding portion 15 and a receiving recessed portion 16 fit therein are formed at a proximal end portion 4a of each beam part 4 to be connected to the weight part 3 (first and second embodiments), so that horizontal movements of the weight part 3 are limited with a simple structure, and that an excessive stress is prevented from being applied to the beam parts 4 even when a side impact is applied. Accordingly, the beam parts 4 are prevented from breaking, and there is no possibility of being unable to measure an acceleration.

According to another structure to replace the protruding portion 15 and the receiving recessed portion 16 fit therein, a recessed portion 3a is formed in a bottom portion of a weight part 3, while a stopper 21 is formed on a glass part 7 (third embodiment), so that movements of the weight part 3 in the horizontal directions are limited, and its vertically downward movement is also limited, preventing an excessive stress from being applied to the beam parts 4. Accordingly, the beam parts 4 are prevented from breaking, and there is no possibility of being unable to measure an acceleration.

According to still another structure to replace the protruding portion 15 and the receiving recessed portion 16 fit therein, a rectangular frame-shaped stopper 22 to enclose a bottom portion of a weight part 3 is formed on a glass part 7 (fourth embodiment), so that movements of the weight part 3 in the horizontal directions are limited, preventing an excessive stress from being applied to the beam parts 4. Accordingly, the beam parts 4 are prevented from breaking, and there is no possibility of being unable to measure an acceleration.

Note that the present application is based on Japanese Patent Application 2005-024959, the content of such patent application being incorporated into the present application by reference.

The invention claimed is:

1. A semiconductor acceleration sensor having a fixed part and a weight part connected to the fixed part by an elongated pair of beam parts having bending properties so as to electrically detect a movement of the weight part when an acceleration is applied thereto, wherein:

the beam parts are formed having a L-shape, each of the beam parts having proximal ends at two opposite corner sides of the weight part and extending along two sides of the weight part adjacent thereto so as to allow a vertical movement of the weight part when an acceleration in a vertical direction is applied to the sensor;

there are provided a protruding portion protruding from the fixed part toward the weight part, and a receiving recessed portion which receives the protruding portion protruding from the weight part toward the fixed part to surround the protruding portion, at a location close to the proximal end of each of the beam parts and in a space between the weight part and the fixed part; and the protruding portion contacts an inner wall surface of the receiving recessed portion so as to limit horizontal movement of the weight part, when an acceleration in a horizontal direction is applied to the sensor.

2. The semiconductor acceleration sensor according to claim 1, wherein a gap is formed in a base portion of the protruding portion.

3. The semiconductor acceleration sensor according to claim 2, wherein the gap in the base portion of the protruding portion is formed to have a shape which is elongated in a direction perpendicular to a protruding direction of the protruding portion.

4. The semiconductor acceleration sensor according to claim 3, wherein the gap in the base portion of the protruding portion is formed to have a substantially T-shape which also extends into the protruding portion along the protruding direction of the protruding portion.

5. The semiconductor acceleration sensor according to claim 1, wherein a gap is formed in a base portion of the receiving recessed portion.

6. The semiconductor acceleration sensor according to claim 1, wherein:
the protruding portion has a tapered end;
the receiving recessed portion has, at an end thereof, a tapered receiving portion having the same shape as the tapered end of the protruding portion; and
the tapered end of the protruding portion is fit in the tapered receiving portion of the receiving recessed portion while sliding along both tapered surfaces, when the weight part horizontally moves and the receiving recessed portion contacts the protruding portion.

7. A semiconductor acceleration sensor having a fixed part and a weight part connected to the fixed part by an elongated pair of beam parts having bending properties so as to electrically detect a movement of the weight part when an acceleration is applied thereto, wherein:
the beam parts are formed having a L-shape, each of the beam parts having proximal ends at two opposite corner sides of the weight part and extending along two sides of the weight part adjacent thereto so as to allow a vertical movement of the weight part when an acceleration in a vertical direction is applied to the sensor;
the weight part has a recessed portion formed in a bottom portion thereof;
a stopper received within the recessed portion, the stopper being configured to loosely fit the recessed portion and formed on the fixed part immediately below the weight part; and
the stopper contacts an inner wall surface of the recessed portion so as to limit horizontal movement of the weight part, when an acceleration in a horizontal direction is applied to the sensor.

8. The semiconductor acceleration sensor according to claim 7, wherein:
the stopper is formed to have a truncated cone shape; and
the inner wall surface of the recessed portion is formed to be a similar figure to the stopper,
so as to cause impacts to be equivalent when the stopper contacts the inner wall surface of the recessed portion in any directions, each with an acceleration in the horizontal direction being applied to the sensor.

9. A semiconductor acceleration sensor having a fixed part and a weight part connected to the fixed part by an elongated pair of beam parts having bending properties so as to electrically detect a movement of the weight part when an acceleration is applied thereto, wherein:
the beam parts are formed having a L-shape, each of the beam parts having proximal ends at two opposite corner sides of the weight part and extending along two sides of the weight part adjacent thereto so as to allow a vertical movement of the weight part when an acceleration in a vertical direction is applied to the sensor;
a stopper to enclose a bottom portion of the weight part is formed on the fixed part below the weight part; and
the bottom portion of the weight part contacts an inner surface of the stopper so as to limit horizontal movement of the weight part, when an acceleration in a horizontal direction is applied to the sensor.

10. The semiconductor acceleration sensor according to claim 9, wherein:
the bottom portion of the weight part is formed to have a truncated quadrangular pyramid shape; and
the inner surface of the stopper to contact the bottom portion of the weight part is formed in a sloped surface extending along a peripheral surface of the weight part.

11. The semiconductor acceleration sensor according to claim 7, wherein the stopper on the fixed part below the weight part is formed of a material different from the fixed part and softer than the weight part.

12. The semiconductor acceleration sensor according to claim 11, wherein the stopper is formed by subjecting a silicon wafer to anisotropic wet etching.

13. The semiconductor acceleration sensor according to claim 8, wherein the stopper on the fixed part below the weight part is formed of a material different from the fixed part and softer than the weight part.

14. The semiconductor acceleration sensor according to claim 9, wherein the stopper on the fixed part below the weight part is formed of a material different from the fixed part and softer than the weight part.

15. The semiconductor acceleration sensor according to claim 10, wherein the stopper on the fixed part below the weight part is formed of a material different from the fixed part and softer than the weight part.

16. The semiconductor acceleration sensor according to claim 13, wherein the stopper is formed by subjecting a silicon wafer to anisotropic wet etching.

17. The semiconductor acceleration sensor according to claim 14, wherein the stopper is formed by subjecting a silicon wafer to anisotropic wet etching.

18. The semiconductor acceleration sensor according to claim 15, wherein the stopper is formed by subjecting a silicon wafer to anisotropic wet etching.

* * * * *